United States Patent
Myers

(10) Patent No.: US 10,122,387 B2
(45) Date of Patent: Nov. 6, 2018

(54) PORTABLE ANTENNA WITH BUILT-IN AMPLIFIER FOR TWO-WAY OR ONE-WAY COMMUNICATIONS

(71) Applicant: Steven Lloyd Myers, Parkland, FL (US)

(72) Inventor: Steven Lloyd Myers, Parkland, FL (US)

( * ) Notice: Subject to any disclaimer, the term of this patent is extended or adjusted under 35 U.S.C. 154(b) by 103 days.

(21) Appl. No.: 15/162,601

(22) Filed: May 23, 2016

(65) Prior Publication Data
US 2017/0338570 A1 Nov. 23, 2017

(51) Int. Cl.
*H04B 1/00* (2006.01)
*H04B 1/04* (2006.01)

(52) U.S. Cl.
CPC ....... *H04B 1/00* (2013.01); *H04B 2001/0408* (2013.01)

(58) Field of Classification Search
CPC ........ H01Q 1/243; H01Q 21/26; H01Q 1/273; H01Q 1/38; H03F 3/19; H03F 3/245; H03F 1/52
See application file for complete search history.

(56) References Cited

U.S. PATENT DOCUMENTS

| | | | | |
|---|---|---|---|---|
| 6,240,126 B1* | 5/2001 | Ohashi | ................ | H04B 1/7143 375/130 |
| 6,625,424 B1* | 9/2003 | Mohindra | ................ | H03C 3/40 455/82 |
| 9,438,187 B2* | 9/2016 | Yamaoka | ................ | H03F 3/245 |
| 2008/0068271 A1* | 3/2008 | Iwai | ....................... | H01Q 1/245 343/702 |

* cited by examiner

*Primary Examiner* — Nhan Le
(74) *Attorney, Agent, or Firm* — Sidney W. Kilgore, P.A.; Sidney W. Kilgore, Esq.

(57) ABSTRACT

Disclosed are embodiments of portable antennae and systems for radio communications requiring low-noise receiving means, or in which interconnecting transmission line insertion loss between receiver or transceiver equipment and a distant antenna impairs such radio communications. A method of use is also disclosed, in which an antenna in a passive state may be turned on automatically upon the initiation by a radio operator of a transmission.

18 Claims, 15 Drawing Sheets

PORTABLE ANTENNA WITH BUILT-IN AMPLIFIER FOR TWO-WAY OR ONE-WAY COMMUNICATIONS

CROSS-REFERENCES TO RELATED APPLICATIONS

This application claims the benefit of U.S. Provisional Application No. 62/165,937, filed 23 May 2015.

STATEMENT REGARDING FEDERALLY SPONSORED RESEARCH OR DEVELOPMENT

Not applicable.

MICROFICHE APPENDIX

Not applicable.

BACKGROUND OF THE INVENTION

1. Field of the Invention

At least some embodiments disclosed herein relate, in general, to the field of antennae, radio communication systems, and methods for their use, including, but not limited to, those for portable radio communications requiring low-noise receiving means and those in which interconnecting transmission line insertion loss between receiver or transceiver equipment and a distant antenna impairs such radio communications.

2. Background

The following background information is intended solely for illustrative purposes, and in no way should be construed as a limitation on the teachings or any embodiments disclosed herein.

The UHF Satcom System is a military communications system utilizing a multiplicity of geosynchronous satellites with dedicated transponders, operating worldwide, 24-hours a day, with operating frequencies from 243 MHz to 380 MHz. Currently, various types of satellites comprise the space-borne network: legacy satellites such as MILSAT, FLTSATCOM, LEASAT, etc., current generation satellites such as Ultra High Frequency Follow-On (UFO), and new generation satellites, such as the Mobile User Objective System (MUOS) which first began to be deployed in 2014. These satellites enable communication throughout military assets worldwide; however, during high traffic times, downlink signals from legacy and UFO satellites become very weak and difficult to receive without the use of directional, high-gain antennas. Although the uplink signal is seldom the weak link, and an operator in the field may be heard clearly, the download signal often proves insufficient to provide the operator with the ability to receive a clear response consistently and reliably.

A dismounted warfighter (i.e., a combat personnel soldier), which may be in Special Operations Forces (SOF), is considered to be "on foot," and possibly engaged in a mission, in which the use of high-gain, directional antennae can be cumbersome and time-consuming, and can seriously compromise the safety of a dismounted warfighter or his team or unit. High-gain directional antennae currently in use by SOF, which typically fold into a relatively small pouch for transport, can be relatively large when deployed for use, and the time required to deploy and collapse these antennae are on the order of one to 15 minutes or more, depending on the gain of the given antenna. Battery-operated portable radio transceivers carried by military personnel often do not have sufficient gain or sensitivity to enable UHF Satcom communications, typically used by dismounted warfighters, using a low-gain antenna. These limitations often result in signals that are too weak to be intelligible when they are most needed.

Another limitation with respect to a high-gain antenna is its radiated field, which is significantly directional in nature. This requires that it be pointed towards a satellite to achieve a maximum signal, and that this orientation be maintained throughout communications, severely limiting the mobility of a dismounted warfighter serving as a radio operator and his SOF team. Furthermore, maximization of high-gain antennae to overcome link budget shortcomings carries with it a risk of exposing an SOF team to enemy surveillance and direction-finding activities.

Teams engaged in urban military combat or law enforcement often utilize portable radio transceivers and an earpiece and microphone combination for intra-team coordination and communications. Typically, such communications occur in the VHF or UHF radio spectrum, to limit the effect of attenuation through structures—walls, floors, etc.—which increases with increasing frequency, while keeping antenna size small enough for effective operation (as antenna size grows when frequency is lowered). Urban environments can be challenging for a radio connection due to their severe absorption and reflection by large structures, such as walls and metal structures larger than ½ wavelength at any one or more dimension, multipath, etc. Furthermore, battery-operated transceivers will typically have a low-power output, usually between 100 mW and five watts. Long-term health hazards would also limit the radiated power to under five watts. Oftentimes, portable radios are designed for cost and enjoy limited sensitivity, which further compounds to the challenging urban communications environment.

When maintaining communications in frigid or other human hazardous environments in the field (outdoors), or in safety and survival situations, it is often necessary to place an antenna used to effect communications outside a safe area, or at a distance from shelter. The distance between an antenna and receiver or transceiver equipment needs to be closed with a transmission line (for example, a coaxial cable), resulting in insertion loss, which is a function of the length of the line, and frequency. The purpose of communications may be to send an emergency signal and be able to receive rescue instructions, or to maintain periodic non-emergency communications. In some applications, signals may be fairly weak, such as at the fringe of a satellite footprint, or from LEO (Low Earth Orbiting) satellite services such as Iridium, Thuraya, Argos, Orbcomm, Inmarsat, GMDSS (Global Marine Distress Safety and Survival), Wavix, etc. In applications described above, weak signals, coupled with the insertion loss created by a lengthy transmission line, and the limitations of the battery-powered radio equipment, aggregate to make communications difficult.

DETAILED DESCRIPTION OF THE INVENTION

The following description and drawings are illustrative and are not to be construed as limiting. Numerous specific details are described to provide a thorough understanding. However, in certain instances, well-known or conventional details are not described in order to avoid obscuring the description. References to "one embodiment" or "an embodiment" in the present disclosure are not necessarily references to the same embodiment; and, such references mean at least one.

Reference in this specification to "one embodiment" or "an embodiment" or "a particular embodiment" means that a particular feature, structure, or characteristic described in connection with the embodiment is included in at least one embodiment of the disclosure. The appearances of the phrase "in one embodiment" or substantially similar phrases in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
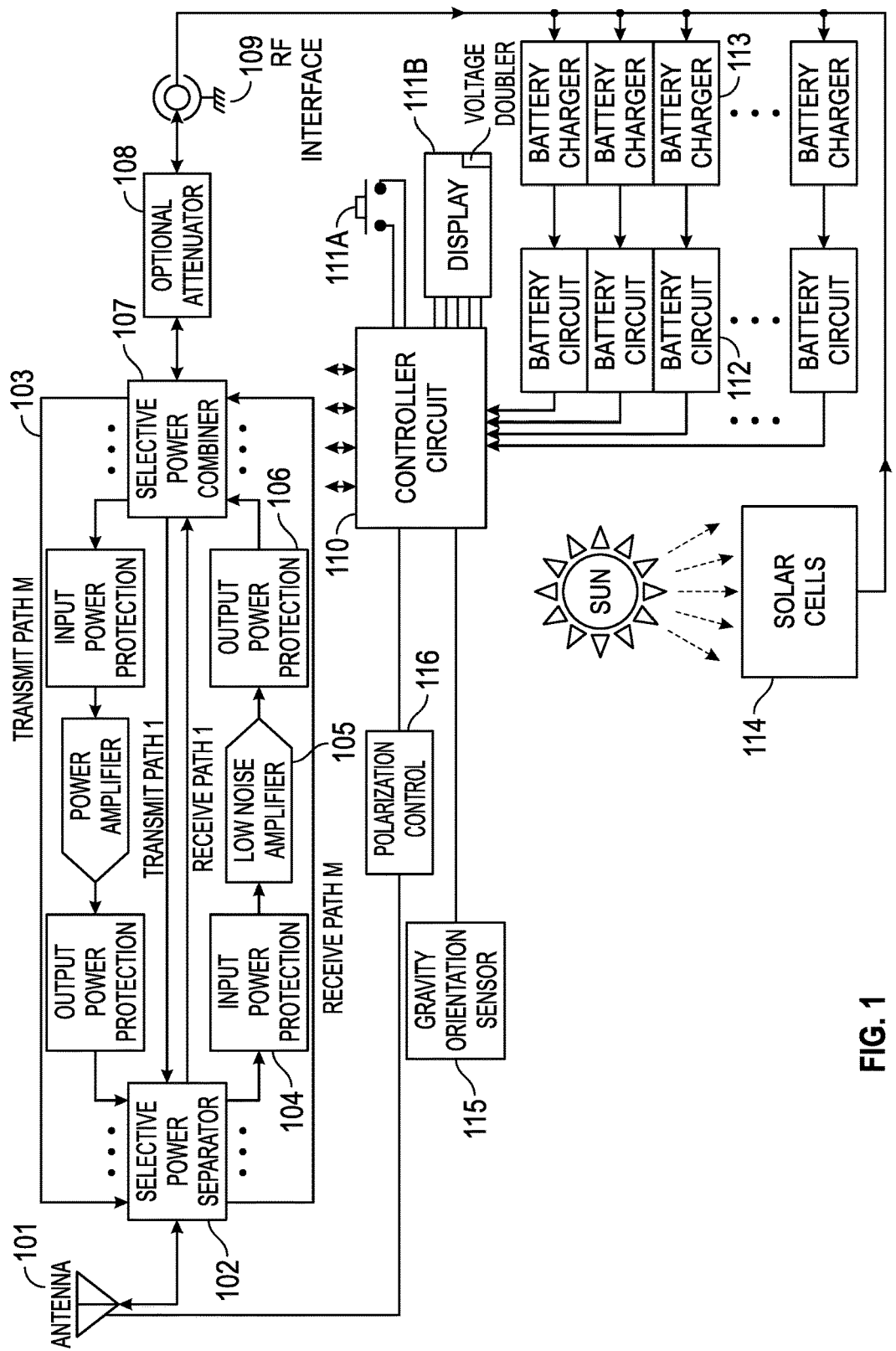
FIG. 1 Block Diagram of an Embodiment

FIG. 1 illustrates an embodiment of a radio frequency antenna system apparatus comprising an Antenna 101. By way of example, but not limitation, an Antenna 101 may be a Turnstile antenna (a pair of concentric, orthogonal or perpendicular dipole antennas) fed by a Quadrature Hybrid Coupler, or another passive or active antenna structure, such as a dipole antenna. Said Antenna 101 may incorporate electrically tuning means to adjust its impedance matching, for example, for transmit or receive portions of the band.

An embodiment may comprise a Selective Power Separator 102, which may be a switch (capable of routing signals through two or more different paths, as determined by one or more control signals), a diplexer (which can route signals through two or more different paths, as determined by the signal's carrier frequency), a directional device, such as a circulator, an isolator, a directional coupler, or any active circuit equivalent (which can route signals through two or more different paths, as determined by the direction of the signal's flow) now known in the art or later to be developed. In an embodiment, a transmit path may be effectuated by means of a Transmission Line 103, such as, by way of example but not limitation, a coaxial cable. A Selective Power Separator 102 may comprise one or a plurality of low loss, single pole, double throw (SPDT) switches, at least one for transmit signals and at least one for receive signals, in which the transmit path is bypassed (e.g., where a transmit path is effectuated by means of a Transmission Line 103).

An embodiment may incorporate in its transmit path or receive path, or both, a Radio Frequency Power Protection Input Device 104, such as a limiter (which may comprise a pin diode), the sensitivity of which may be enhanced with the addition of a sensitive detector (which may comprise a detector diode). Said Radio Frequency Power Protection Input Device 104 may comprise a two-stage limiter, and to enhance sensitivity of the limiter, further may comprise a Schottky diode detector, which may provide effective signal limitation below +10 dBm, and may be under −10 dBm to safeguard an LNA. An embodiment further may include in its transmit path or receive path, or both, a Low Noise Amplifier (LNA) 105, which may having a Low Noise Figure (LNF) under four dB.

An embodiment may comprise a Radio Frequency Power Protection Output Device 106, which may be similar to a Radio Frequency Power Protection Input Device 104, and may comprise a multi-stage limiter, and to enhance sensitivity of the limiter, further may comprise a Schottky diode detector, which may provide more effective signal limitation. By way of example, but not limitation, with the addition of a Schottky diode detector, a +10 dBm limiter could provide effective signal limitation under −10 dBm to safeguard an LNA. A Selective Power Combiner 107, which may be similar to a Selective Power Separator 102, may be included in an embodiment.

In an embodiment, an Attenuator 108 may be included to stabilize the operation of internal radio circuits, manage signal power levels, and assure a maximum impedance mismatch to keep a signal's Voltage Standing Wave Ratio (VSWR) under a specified limit. An Attenuator 108 may have a value under three dB. An embodiment may comprise a Radio Frequency Interface 109, such as, by way of example and not limitation, a coaxial connector, which may serve to connect an embodiment to a radio transceiver (for two-way communications), or a radio receiver (for one-way communications).

A Controller Circuit 110, which may comprise sensors, actuators and signal processing means, such as a microcontroller, a microprocessor, programmable logic (PAL/Programmable Array Logic, GAL/Generic Array Logic, CPLD/Complex Programmable Logic Device, FPGA/Field-Programmable Gate Array, etc.), or a dedicated circuit made with discrete devices, may be incorporated in an embodiment to serve to manage various elements in an embodiment. These elements may include, but are not necessarily limited to, an Antenna 101, a Selective Power Separator 102, a Radio Frequency Power Protection Input Device 104, a Low Noise Amplifier (LNA) 105, a Radio Frequency Power Protection Output Device 106, a Selective Power Combiner 107, an Attenuator 108, and the Controller Circuit 110 itself. A Controller Circuit 110 in an embodiment may comprise one or more sensors for input and output radio signal levels, input and output limiter feedback, a transmit/receive detector, one or more batteries, one or more battery chargers, one or more LNA supply sensors, one or more LNA bias sensors, one or more temperature sensors, or any combination thereof. In an embodiment, a Controller Circuit 110 may comprise actuators to connect and disconnect power or batteries, or both, to control a Selective Power Separator 102 or a Selective Power Combiner 107, or both, to tune an Antenna 101, to communicate with Display Means 111B and any signal processing means of the Controller Circuit 110 itself.

An embodiment may include a User Interface 111, which may comprise Input Means 111A, such as one or more push-button switches, a small keyboard, or other means of data input now known in the art or later to be developed, and Display Means 111B, such as Electronic Paper (E-Ink), LCD (Liquid Crystal Display), LED (Light Emitting Diode), or other means of displaying output now known in the art or later to be developed. An embodiment may comprise Input Means 111A that are waterproof. In an embodiment, Display Means 111B may be waterproof. A Display Means 111B may comprise a Voltage Doubler 111C.

In an embodiment, one or more Battery Circuits 112 comprising batteries, which further may comprise temperature sensors and temperature delimiters or voltage sensors and voltage delimiters, or both, may be employed to provide direct current (DC) power to the circuits of an Antenna 101, a Selective Power Separator 102, a Radio Frequency Power Protection Input Device 104, a Low Noise Amplifier (LNA) 105, a Radio Frequency Power Protection Output Device 106, a Selective Power Combiner 107, an Attenuator 108, a Radio Frequency Interface 109, and a Controller Circuit 110. Batteries in an embodiment may be rechargeable for convenience, and an embodiment may comprise one or more Battery Chargers 113 to manage the replenishment of battery energy. DC power can be supplied in an embodiment via a Radio Frequency Interface 109, or through a separate connection or connector, eliminating the need for batteries. An embodiment may comprise one or more Energy-Generating Means 114, such as one or more solar cells, a crank generator, or other means of generating energy, now known or later to be developed in the art, to produce energy when operating an embodiment in remote locations. In an embodiment, a Controller Circuit 110 may manage a User Interface 111, one or more Battery Circuits 112, one or more Battery Chargers 113, one or more Energy-Generating Means 114, or any combination thereof.

An embodiment may comprise a Gravity Orientation Sensor 115 and Polarization Control Means 116 to enable inversion of polarization from Right Hand Circular (RHC) to Left Hand Circular (LHC). Such an embodiment may function in both an upright and inverted position, for example, if an embodiment is affixed upside-down to the roof of the cockpit of an aircraft.

An embodiment suitable for use in communications via UHF or VHF intra-team communication may comprise an Antenna 101 that is linearly polarized, such as a dipole (electric dipole), a loop (often referred to as a magnetic dipole), or an unbalanced dipole-like structure enabling it to be human-wearable.

Figure 2:
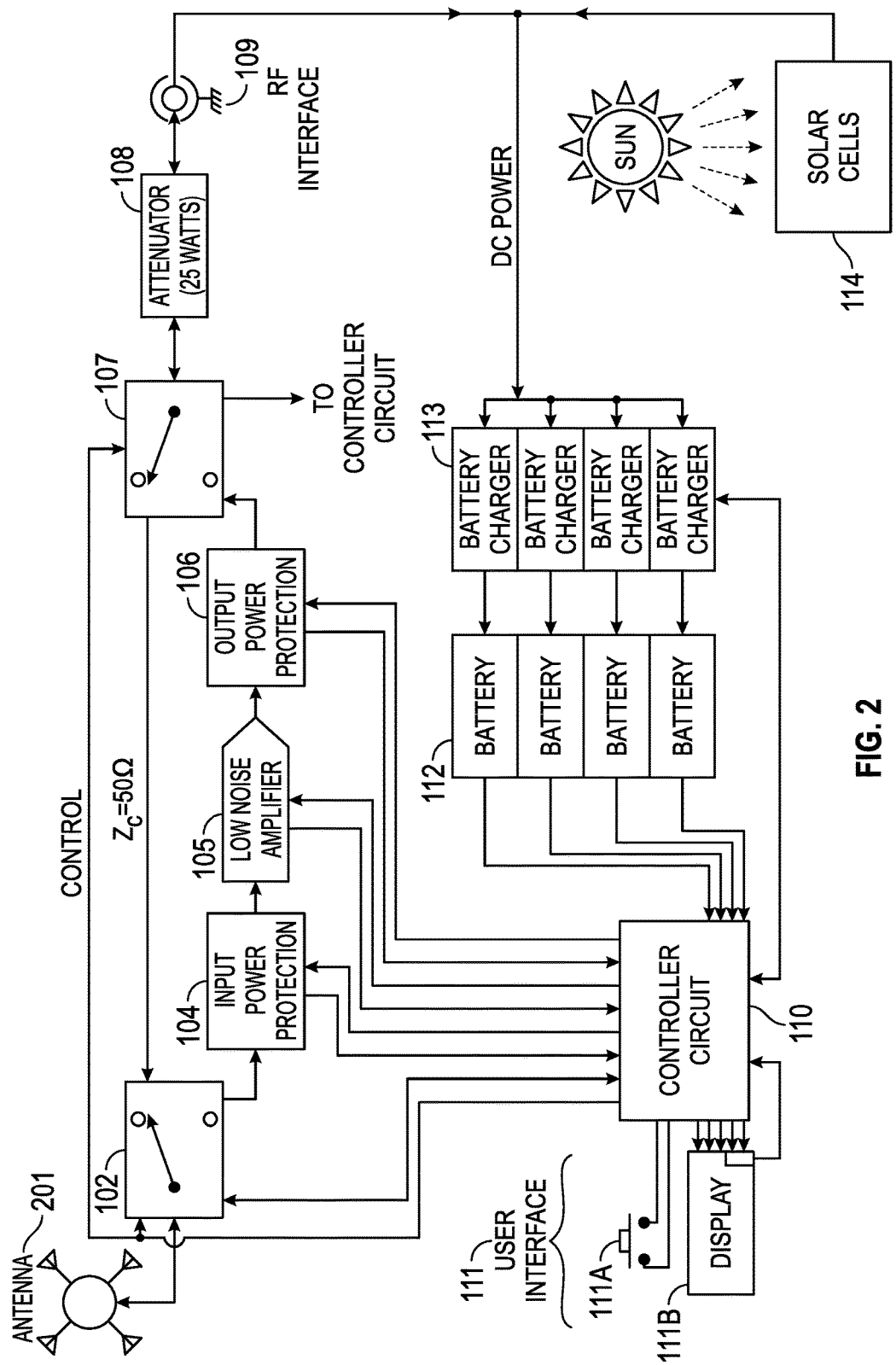
FIG. 2 Block Diagram of an Embodiment for UHF Satcom

A block diagram of an embodiment suitable for use in communications via UHF Satcom, such as military communications, is presented in FIG. 2. By way of example and not limitation, the Antenna 101 in the embodiment presented in FIG. 2 may be a Turnstile Antenna 201, comprising pair of concentric, orthogonal or perpendicular dipole antennas fed by a quadrature hybrid coupler, in which the elements may be tuned, to improve efficiency at both transmit and receive frequencies. Schematic Diagrams for the construction of such an embodiment have been provided in FIGS. 3A-C, 4A-E, and 5-A-N for additional clarification.

In a half-duplex system, there are two clearly defined paths or channels between communicating parties, but the communication is one direction at a time such that each party can communicate with the other, transmitting and receiving signals at different times, but not simultaneously. An embodiment appropriate for communications via UHF Satcom may comprise a half-duplex system, which produces the lowest Antenna Noise Figure (ANF), and thus greater sensitivity. This is so because the insertion loss of a switch used as a Selective Power Separator 102 or of a switch used as a Selective Power Combiner 107 is typically between 0.2 and 1.0 dB at UHF frequencies, whereas a diplexer's insertion loss ranges between two and six dB within the UHF Satcom spectrum. Furthermore, a switch is physically much smaller than a diplexer at low UHF frequencies. A circulator in this range would be both large and heavy, as it includes a permanent magnet. It also would interfere with the use of a compass. Active directional circuits would consume much more DC power than a switch (which usually draws under 50 microAmperes of current), as it would need to have a wide dynamic range, capable of supporting UHF signal levels up to 25 watts, which is typical of standard military radios, such as a PRC-117 or PSC-5.

An embodiment may be capable of transmitting up to 25 watts, while providing a receive gain of approximately 20 dB, with an ANF of approximately 1.5 dB, and a total, peak DC power consumption of 4.5 milliAmperes. A Battery Circuit 112 of an embodiment may comprise Lithium-Ion batteries, Lithium Iron Phosphate (LiFePo4) batteries, Nickel Metal Hydride batteries, or other forms of batteries now known in the art or later to be developed. Without the aid of one or more solar cells or other Energy-Generating Means 114, a Battery Circuit 112 of an embodiment comprising four AAA-size Lithium-Ion batteries or Lithium Iron Phosphate (LiFePo4) batteries may run continuously for approximately nine days on a four-hour charge. If one or more solar cells were used as an Energy-Generating Means 114 in an embodiment, battery life could be extended automatically when said one or more solar cells were to be exposed to sunlight during normal use. A Controller Circuit 110 in an embodiment may be employed to manage battery use by turning off unused circuitry, while maintaining continuous display updates and user interaction, to extend battery life up to 52 days on a single charge, with no solar cell contribution.

To accelerate and ensure a proper write to an E-Ink display in an embodiment, a Voltage Doubler 111C, may be enabled and used, but only during a display update. E-Ink technology requires a potential of 5-15 volts to write, but the batteries of a Battery Circuit 112 providing power to an embodiment comprising an E-Ink as a Display Means 111B may have voltages below the minimum five volts. By way of example, and not limitation, such batteries could be Li-Ion cells of 3.50-4.20 volts or LiFePo4 cells of 2.50-3.40 volts, for which a Voltage Doubler 111C could produce 7.0-8.4 volts or 5.0-6.8 volts, respectively.

In an embodiment, a Controller Circuit 110 may comprise a microcontroller, such as Microchip's PIC18F26K20, to perform its more complex functions. This type of technology is sequential, requiring a clock that potentially generates radio interference. Such interference may be managed through adequate filtering of each pin of a microcontroller, and by selecting a low clock frequency and creating time-efficient firmware. By way of example, but not limitation, a crystal clock frequency well below the UHF spectrum, such as 153.6 kHz, may be selected. To further reduce potential radio interference by a clock, a ferrite bead, tuned to the low UHF spectrum, may be placed in series with a capacitor-loaded crystal. In an embodiment, a convenient choice of clock frequency could be the Color Burst frequency of 3.57954 MHz, which is popular in microcontroller applications. With adequate circuit design, any clock frequency under 10 MHz may be used successfully in an embodiment.

An embodiment may comprise as its Display Means 111B a multi-segment E-Ink display, by way of example and not limitation, Part Number SC002221, to provide continuous information to a user, which may be updated once every 10 seconds under full operation and once every 40-60 seconds, so that overall current consumption of said Display Means 111B may be only a few microAmperes (possibly under 10 uA). E-Ink displays only consume energy when information is changed, so while information does not change, they consume no energy.

In an embodiment, to handle a desired signal power level, e.g., 25 watts, a Selective Power Separator 102 and Selective Power Combiner 107 may be provided by a solid-state pair of tandem switches which, by way of example, and not limitation, could be Silicon-On-Insulator Skyworks part number SKY13374-397LF, which may rapidly switch between transmit and receive modes in less than 50 microseconds (measured at five uS). The discharge rate of the power protection stages (dual-stage limiter with detector boost) may be set to 875 microseconds (0.85 ins) by a 1.0 kiloOhm resistor in a detector boost circuit, so it may be compatible with Demand Assigned Multiple Access (DANIA), a standard Military Time Division Multiplex protocol that enables multiple users to communicate within a same channel Adjusting a resistor value up or down from 1 kOhm may allow the discharge rate to increase or decrease, respectively. DANIA specifications allow for a 1.25 ms guard band between time blocks, so at 0.85 ms, power protection is effected by keeping the input and output of a Low Noise Amplifier 105 in high attenuation long after the Selective Power Separator 102 and Selective Power Combiner 107 have settled into their proper state, receive or transmit. In an embodiment, a Controller Circuit 110 may include a sensitive detector, a stable voltage reference and a low power, fast comparator to sense and drive or actuate the Selective Power Separator 102 and Selective Power Combiner 107 in the presence of transmitter signals (large signals exceeding the reference voltage).

Figure 3A:
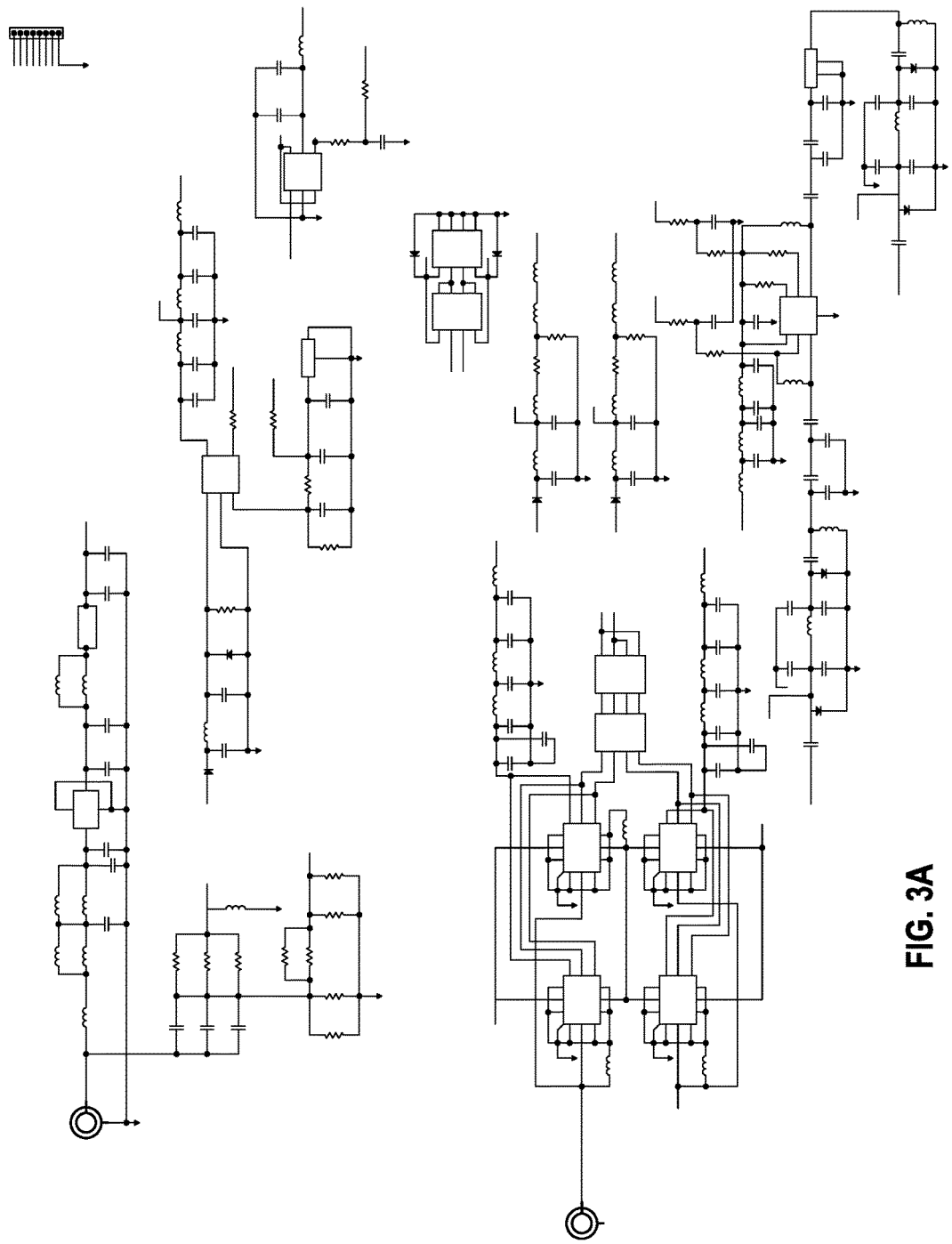
FIG. 3A Power Supply
Figure 3B:
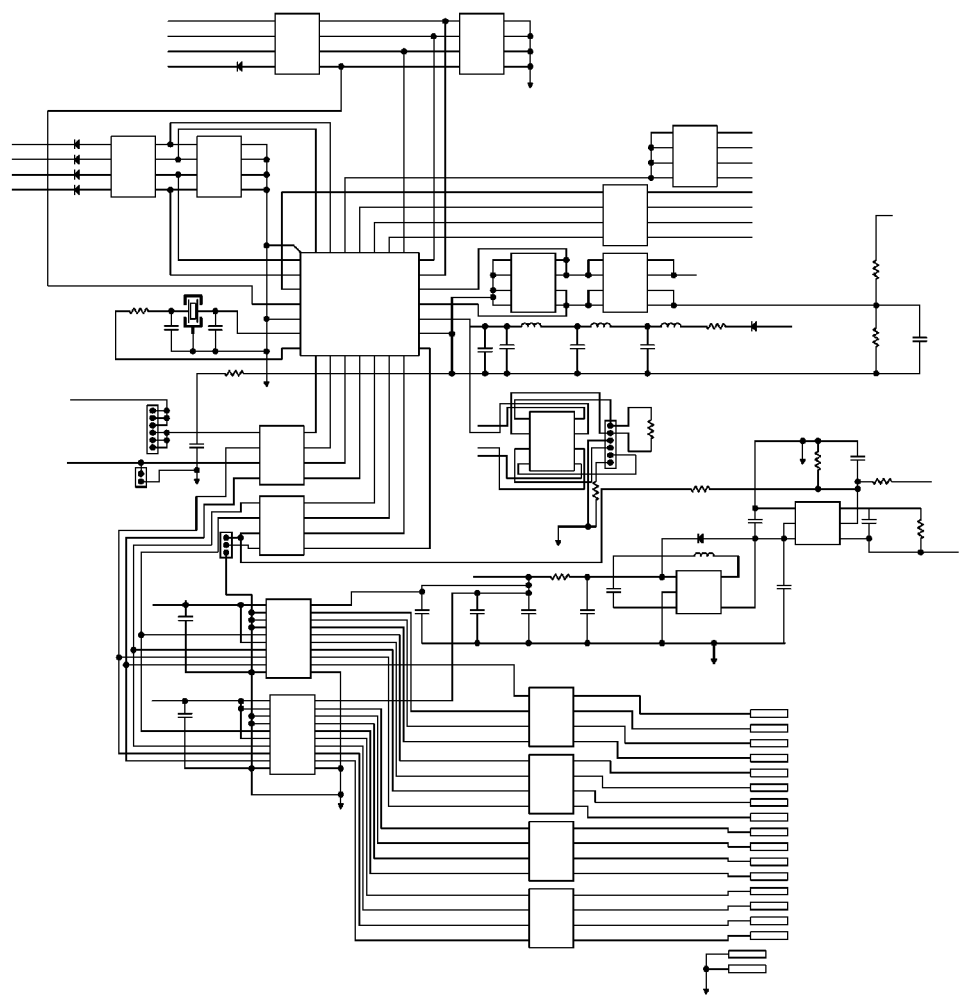
FIG. 3B RF System of an Embodiment
Figure 3C:
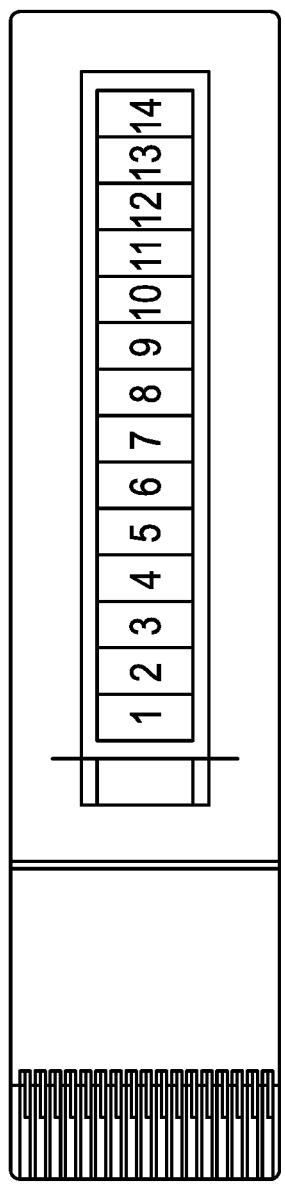
FIG. 3C E-Ink Display of an Embodiment

FIG. 3A presents one possible configuration of an RF system in an embodiment. FIG. 3B provides an example of one possible configuration of a controller and display in an embodiment. FIG. 3C displays one possible configuration for an E-Ink Display in an embodiment.

Figure 4A:
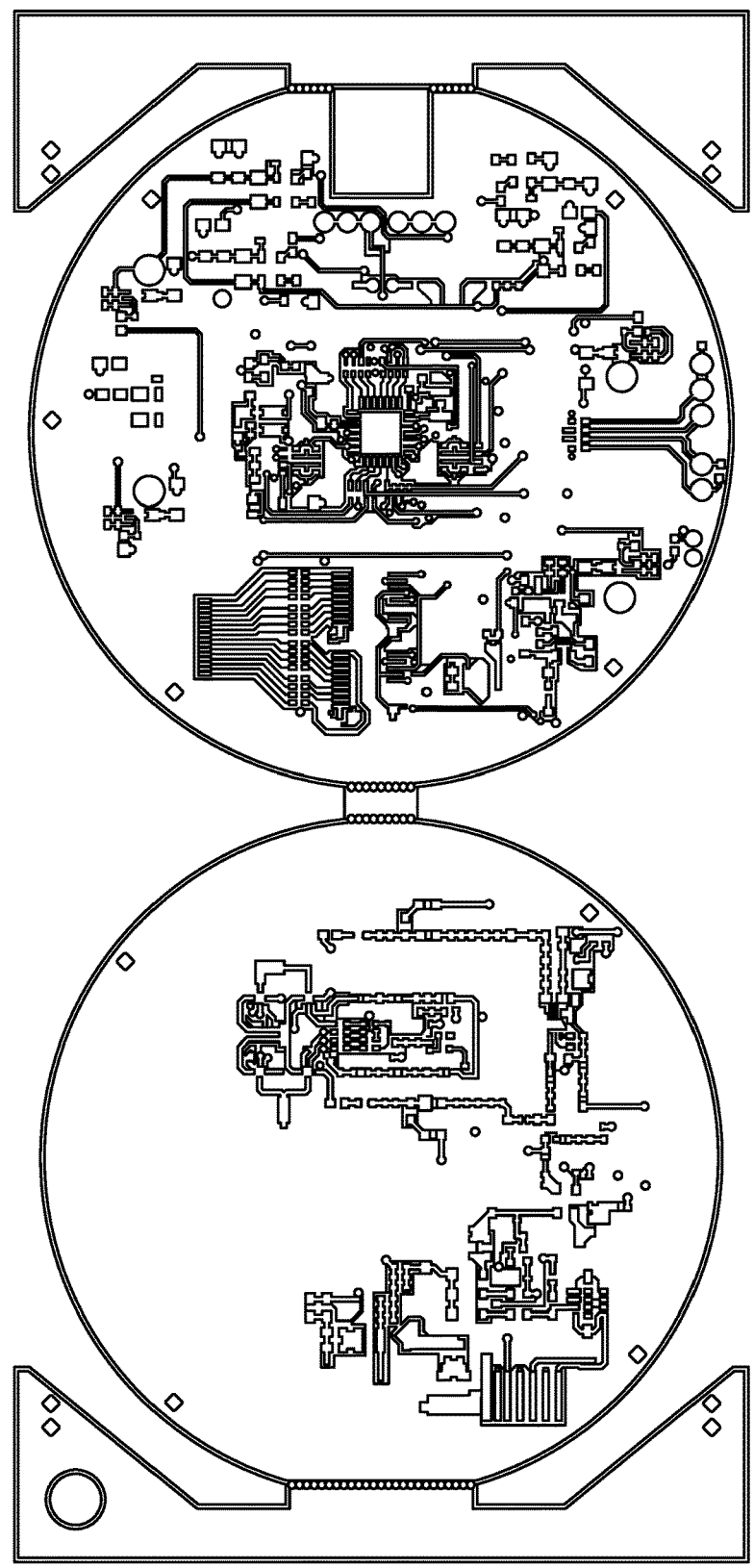
FIG. 4A Printed Circuit Boards, Top Layer (Copper) of an Embodiment
Figure 4B:
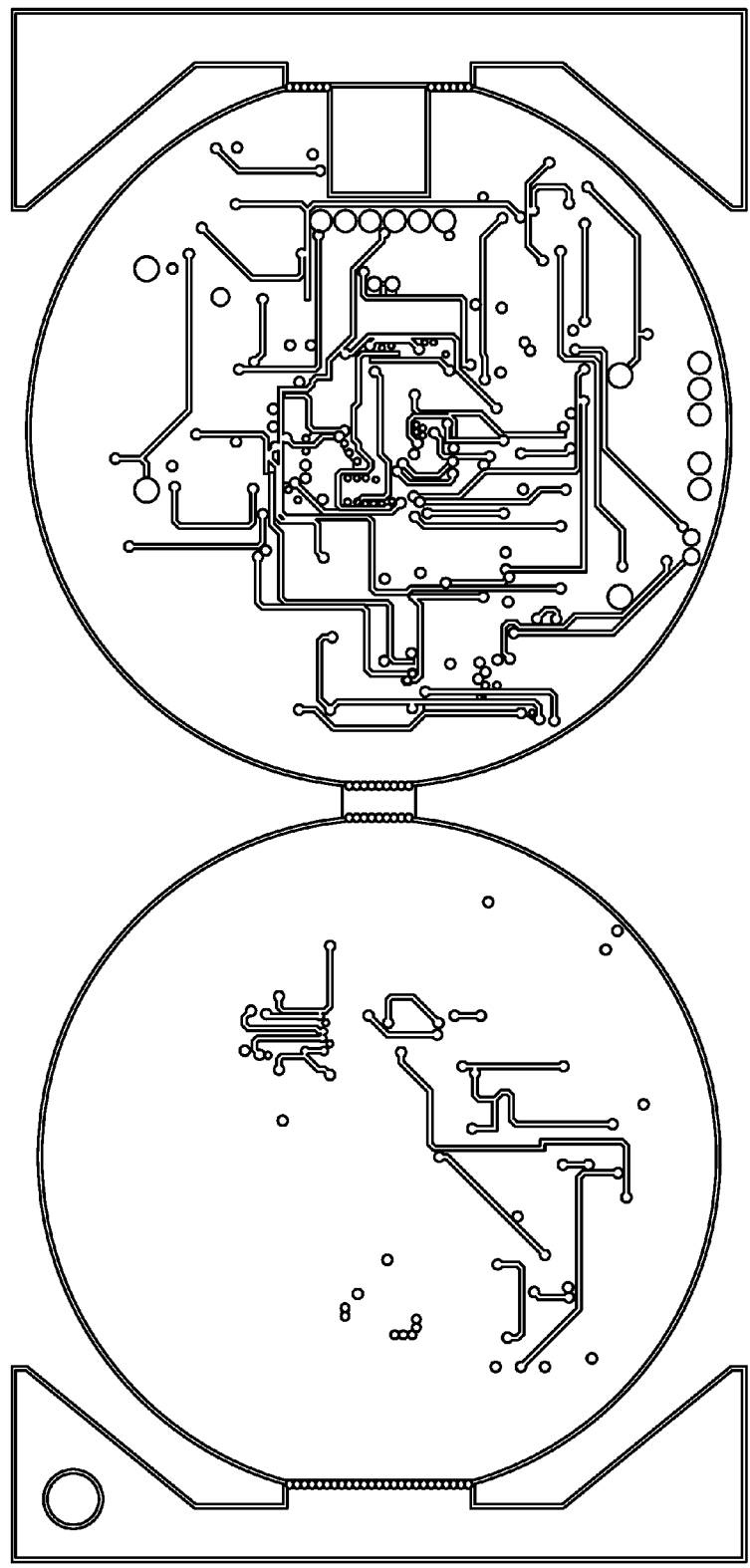
FIG. 4B Printed Circuit Board, Middle Layer 2 (Copper) of an Embodiment
Figure 4C:
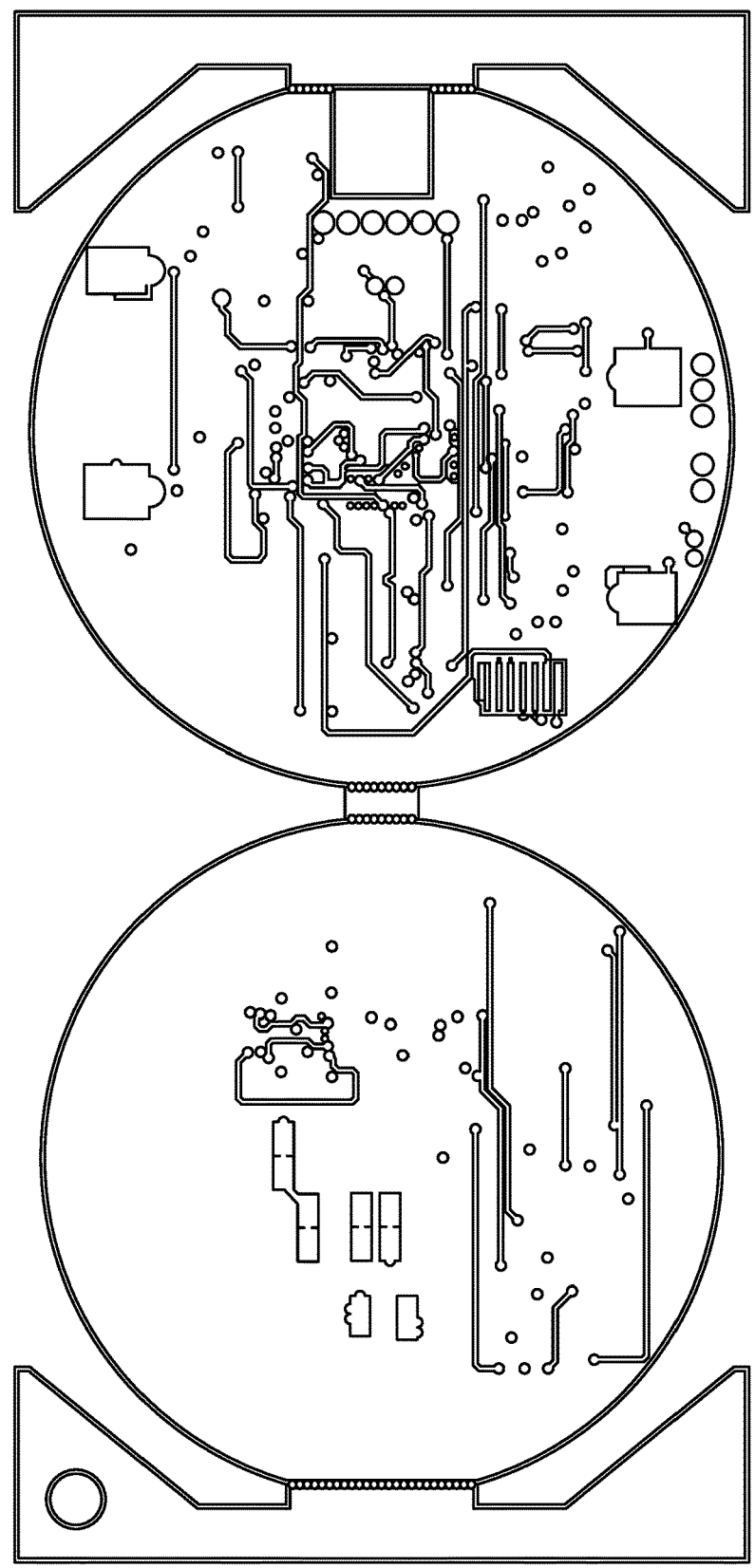
FIG. 4C Printed Circuit Board, Bottom Layer (Copper) of an Embodiment
Figure 4D:
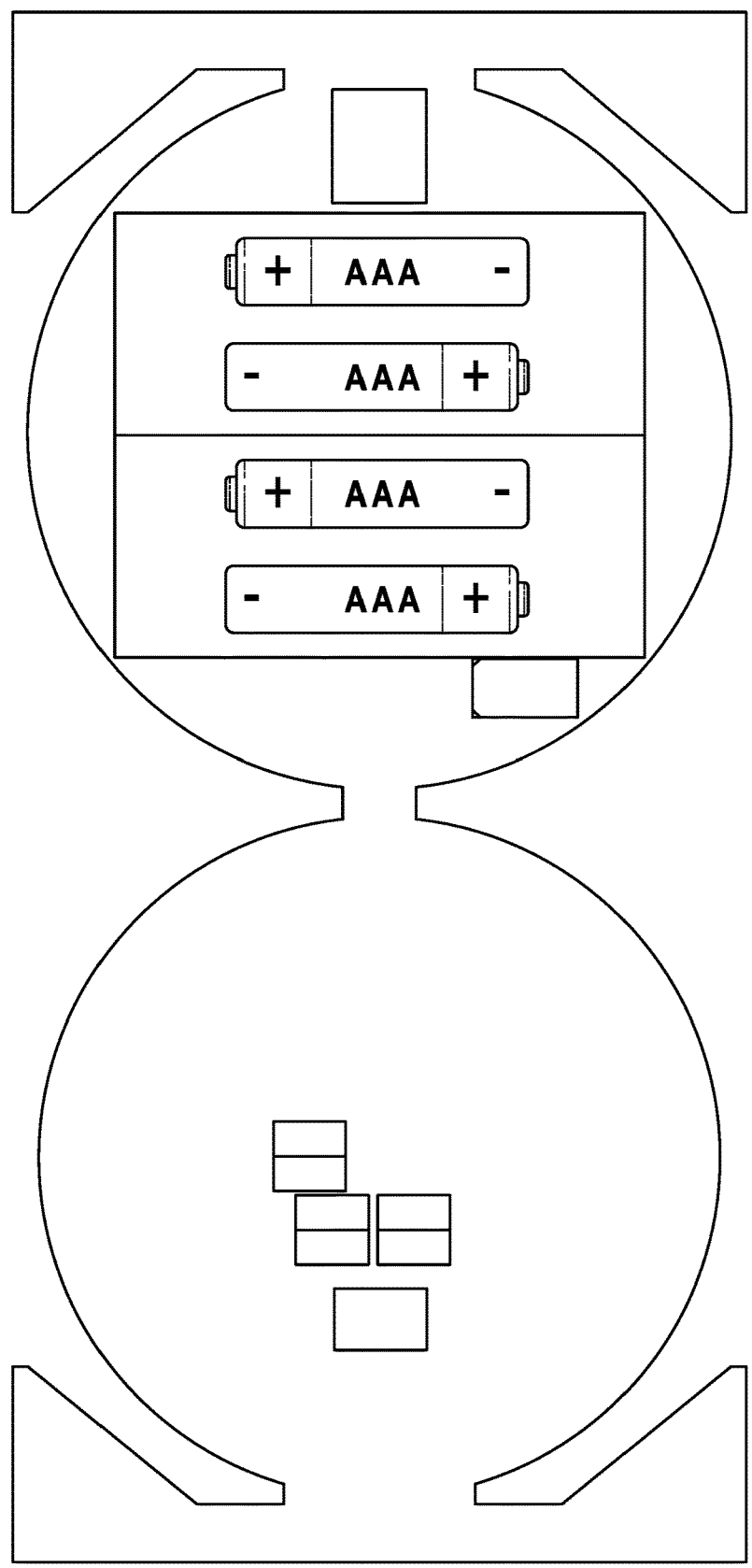
FIG. 4D Printed Circuit Board, Bottom Silk Screen Layer of an Embodiment
Figure 4E:
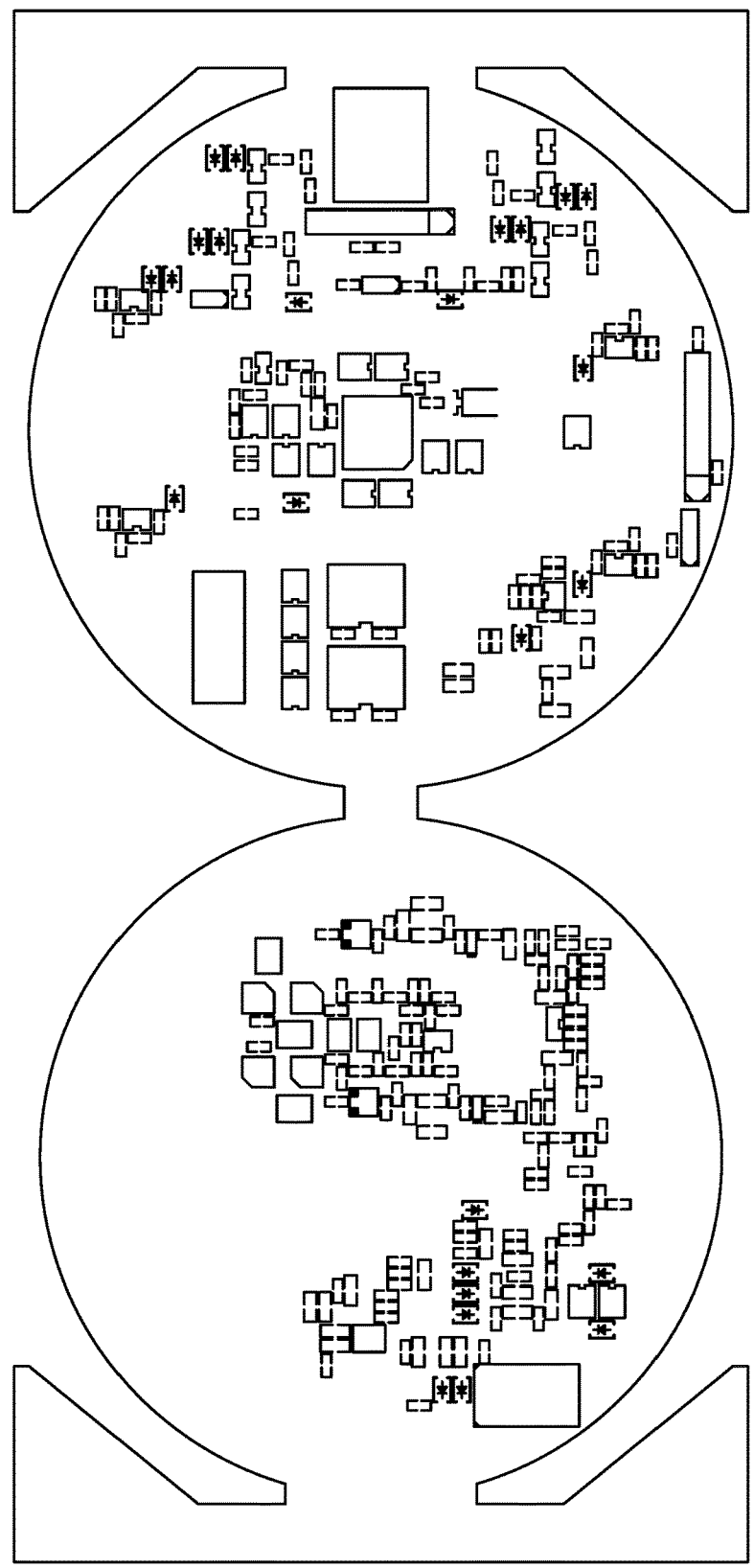
FIG. 4E Printed Circuit Board, Top Silk Screen Layer of an Embodiment
Figure 5A:
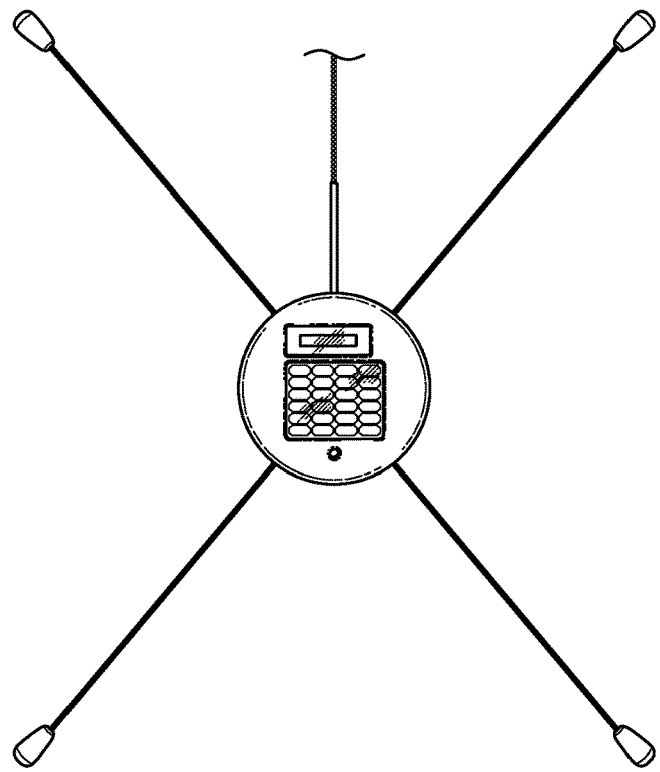
FIGS. 5A-H Physical Appearance of an Embodiment
Figure 5B:
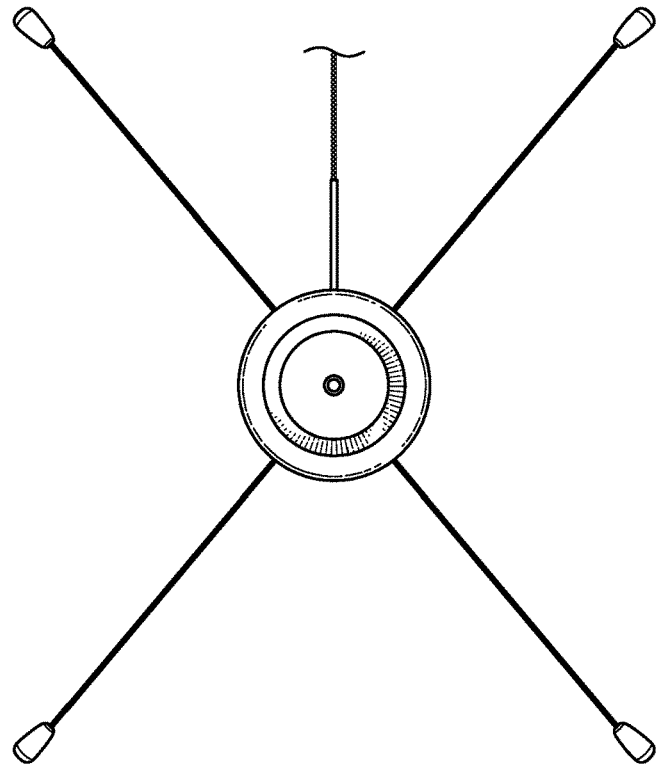

FIG. 4A depicts one possible configuration for the top layer of a printed circuit board in an embodiment. FIG. 4B reflects one possible configuration for a second middle layer of a printed circuit board in an embodiment. FIG. 4C illustrates one possible configuration for a bottom layer of a printed circuit board in an embodiment. FIG. 4D presents one possible configuration of a bottom layer—a silkscreen layer—for a printed circuit board in an embodiment. FIG. 4E provides an example of one possible configuration of a top layer—a silkscreen layer—for a printed circuit board in an embodiment, FIG. 5A is a view of the top of an embodiment reflecting a coaxial cable that might serve as a Transmission Line 103 to be attached to a Radio Frequency Interface 109, and radiating elements of an Antenna 101, which happens to be a Turnstile antenna. FIG. 5B is a bottom view of an embodiment employing Mounting Means 502 to allow it to be secured. In an embodiment, such Mounting Means 502 may be a 20-thread mounting insert to accept a ¼-inch cylindrical threaded fastener, though many other secure means of fastening well known in the art could be employed.

Figure 5C:
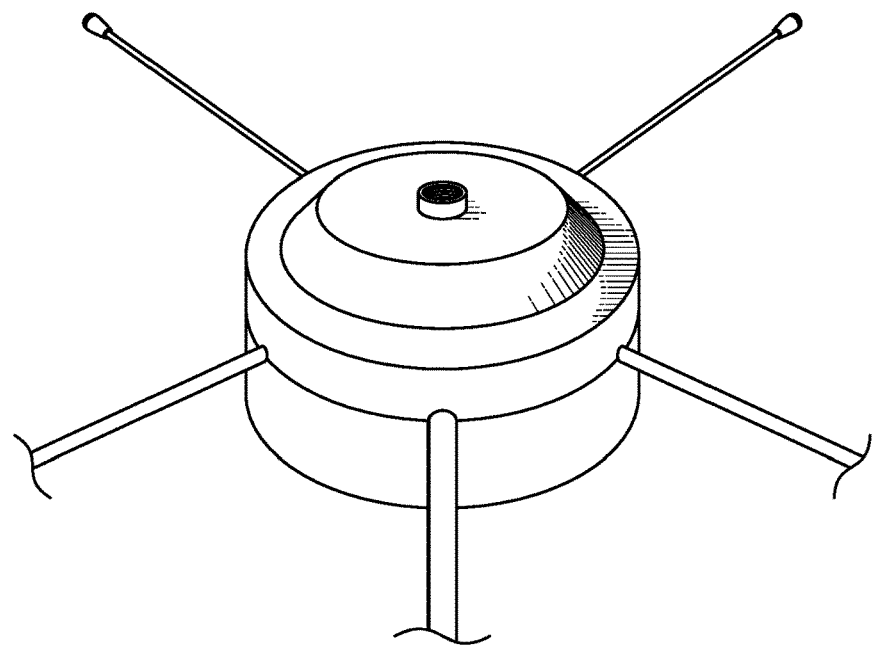
Figure 5D:
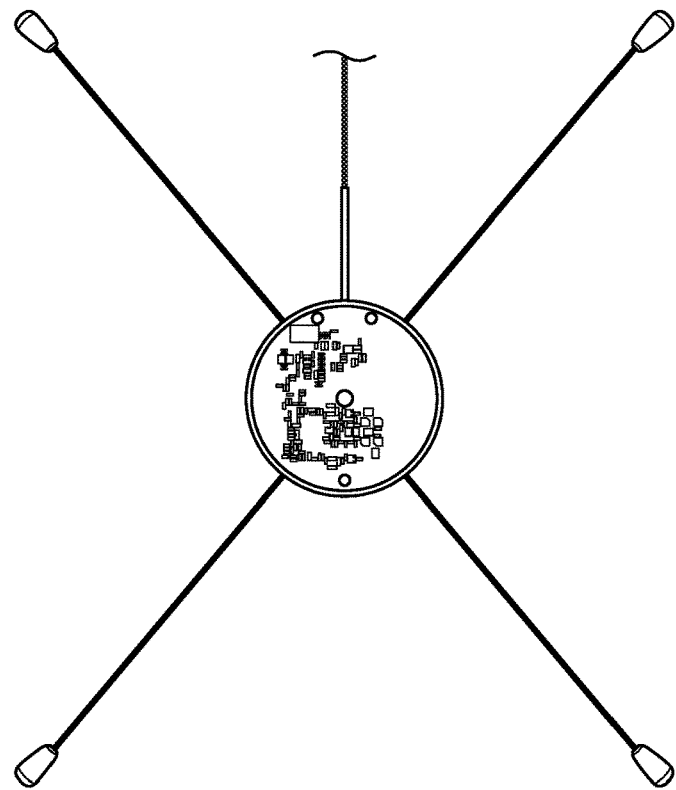

FIG. 5C presents an orthogonal view of an embodiment with its Antenna 101, being a Turnstile antenna, showing its radiating elements and Mounting Means 502 for the embodiment. In FIG. 5D, and RF Printed Circuit Board for an embodiment is visible.

Figure 5E:
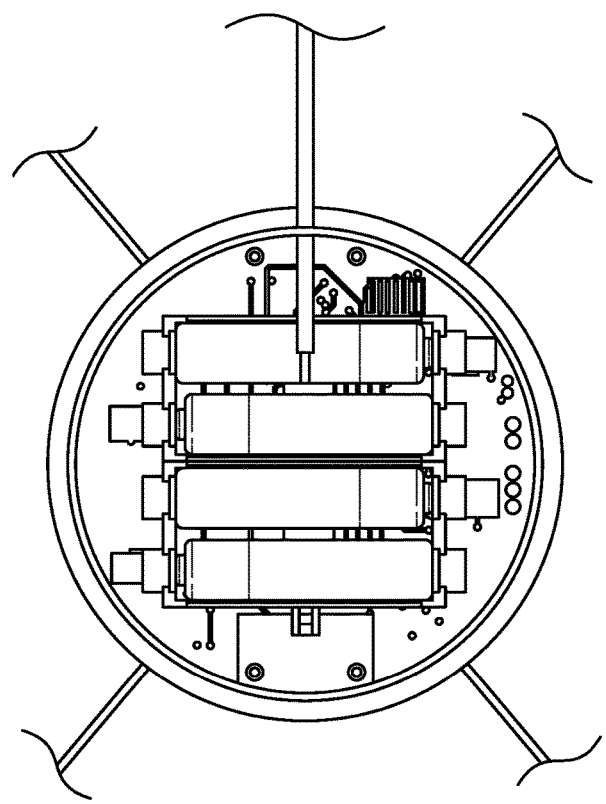
Figure 5F:
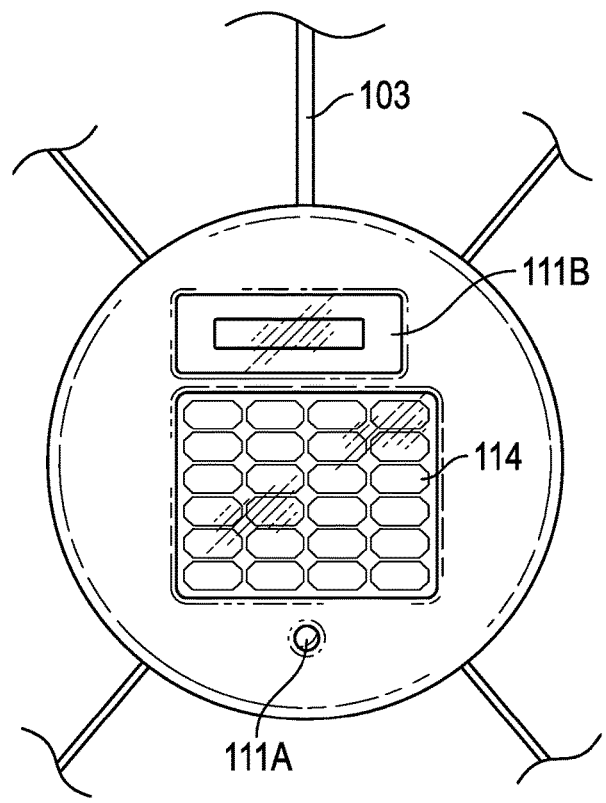

In FIG. 5E, the back of a printed circuit board for a Control Circuit 109 in an embodiment is visible, as are four AAA battery cells embedded in the back of the printed circuit board. FIG. 5F reveals an embodiment comprising a user pushbutton as Input Means 111A, and an E-Ink display as Display Means 111B, as well as a solar cell serving as Energy-Generating Means 114.

Figure 5G:
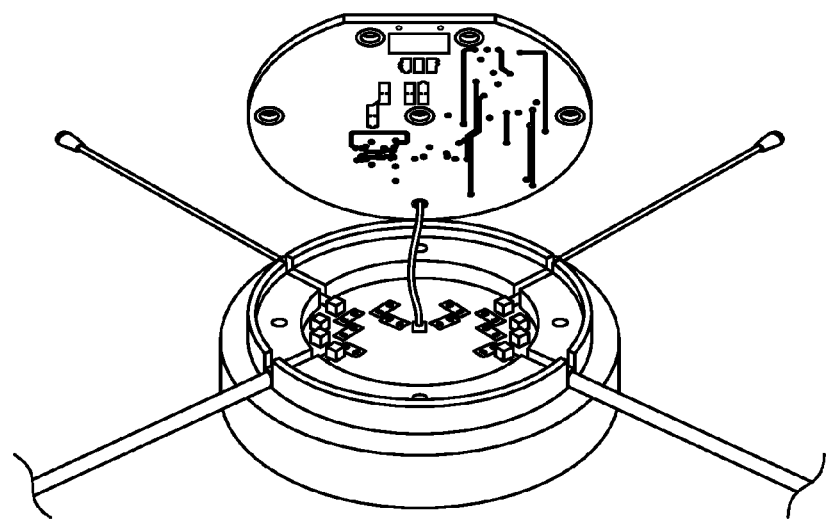
Figure 5H:
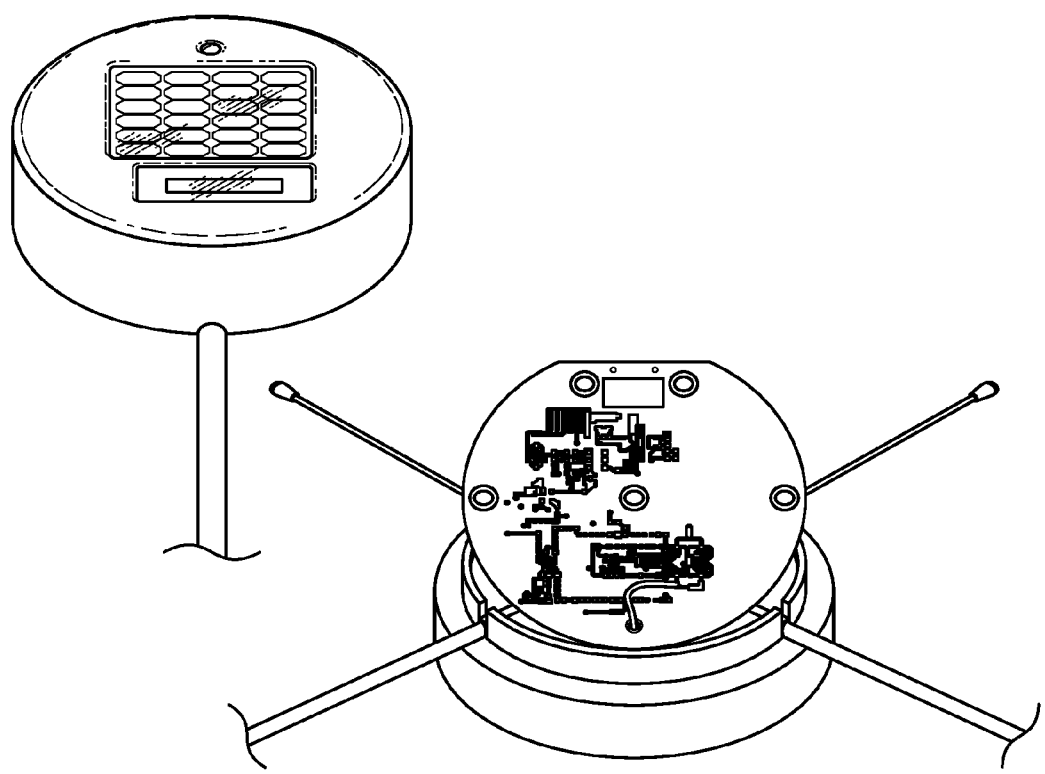
Figure 6:
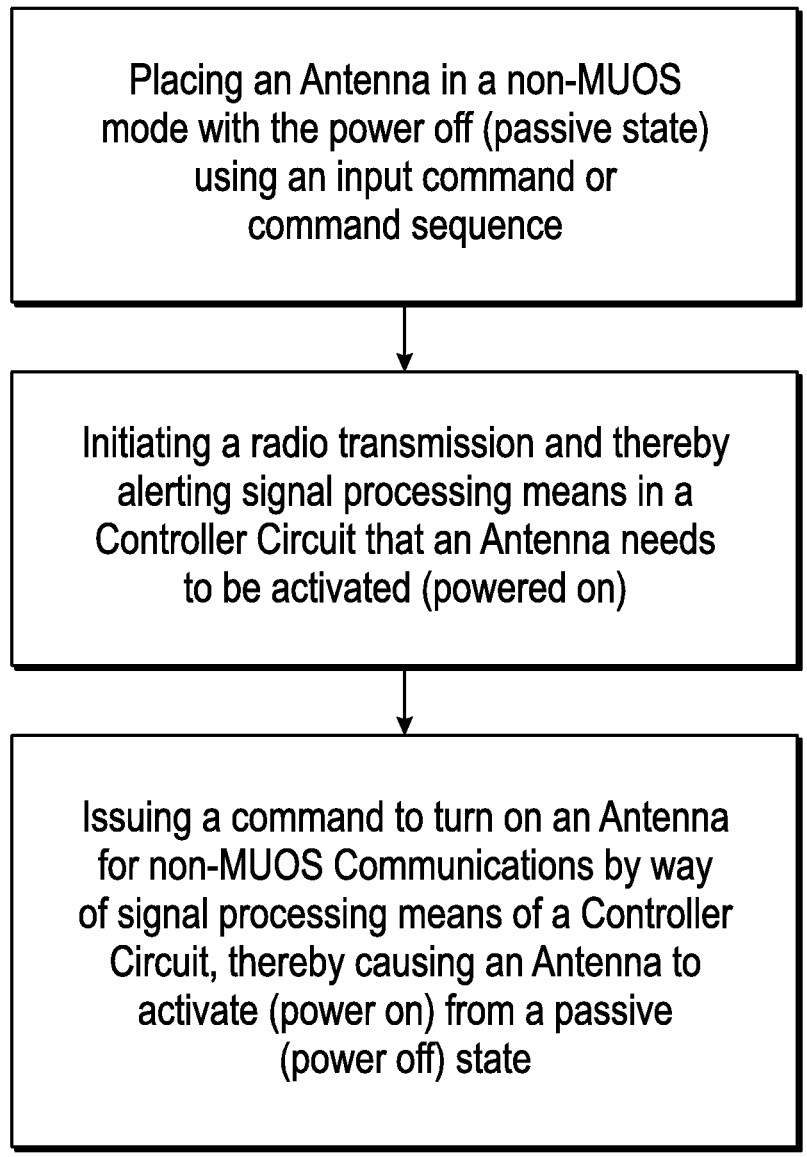
FIG. 6 High-Level Method Flow Chart of Disclosed Embodiments

FIG. 5G shows a Radio Frequency (RF) Electronics Board for an embodiment, a Hybrid Board and matching circuit, and shunt coils to provide electrostatic discharge (ESD) grounding for the system. In FIG. 5H, an RF Electronics Board is illustrated.

Embodiments disclosed herein include the capability of minimizing the unnecessary consumption of power by leaving an Antenna 101 powered off, i.e., in passive mode, so that only the signal processing means within a Controller Circuit 110, a Selective Power Separator 102 and a Selective Power Combiner 107 remain on. Upon commencement of transmission by a radio operator, such as a dismounted warfighter, a signal processing means in a Controller Circuit 110, such as a microprocessor, may be alerted that an Antenna 101 needs to be powered on. Signal processing means of a Controller Circuit 110 then may issue a command to turn on an Antenna 101 for non-MUOS communications. Thus, upon mere initiation of a transmission by a radio operator, an Antenna 101 automatically may be powered up for non-MUOS communications.

An Antenna 101 will remain powered on until a radio operator manually inputs a command or a sequence of commands to power it off. A first manual input command or sequence of commands can power off an Antenna 101 upon entry of the first command or command sequence by a radio operator. A second manual input command or sequence of commands can cause an LFA to remain powered on for a specific period of time designated by a radio operator upon entry of the second command or command sequence by a radio operator.

Communications via the latest MUOS satellite systems require that an Antenna 101 remain in passive mode. Thus, the automatic activation of an Antenna 101 upon the commencement of transmission may be overridden by a third manual input command, so that an Antenna 101 will remain in passive mode, upon entry of the third command or command sequence by a radio operator. Once this MUOS communications mode has been activated by a radio operator, non-MUOS communications cannot take place non-passively until the entry by a radio operator of a fourth manual input command or sequence of commands that can cause an Antenna 101 to power up from its passive mode.

What is claimed is:

1. An apparatus and system comprising:
    an Antenna coupled to a Selective Power Separator, said Selective Power Separator thence coupled in each of one or more receive paths to a Radio Frequency Power Protection Input Device, each said Radio Frequency Power Protection Input Device in a receive path thence coupled to a Low Noise Amplifier, each said Low Noise Amplifier in a receive path thence coupled to a Radio Frequency Power Protection Output Device, and each said Radio Frequency Power Protection Output Device in a receive path thence coupled to a Selective Power Combiner, and said Selective Power Separator further coupled in one or more transmit paths to said Selective Power Combiner;

a Radio Frequency Interface coupled to said Selective Power Combiner;

a Controller Circuit comprising signal processing means, coupled to said Antenna, to said Selective Power Separator, to every Radio Frequency Power Protection Input Device, to every Low Noise Amplifier, to every Radio Frequency Power Output Device, to said Selective Power Combiner, to said Radio Frequency Interface, and to a User Interface comprising Input Means and Display Means.

2. The apparatus and system of claim 1, in which the Antenna is a Turnstile antenna fed by a Quadrature Hybrid Coupler.

3. The apparatus and system of claim 1, further comprising an Attenuator interposed between and coupled to said Selective Power Combiner and said Radio Frequency Interface.

4. The apparatus and system of claim 1, further comprising one or more Battery Circuits, coupled to and interposed between said Radio Frequency Interface and said Controller Circuit.

5. The apparatus and system of claim 4, said Battery Circuits further comprising temperature sensors, temperature delimiters, voltage sensors and voltage delimiters.

6. The apparatus and system of claim 4, further comprising one or more Battery Chargers, coupled to and interposed between said Radio Frequency Interface and said one or more Battery Circuits.

7. The apparatus and system of claim 6, further comprising one or more Energy-Generating Means coupled to said one or more Battery Chargers.

8. The apparatus and system of claim 6, in which the Energy-Generating Means comprise one or more solar cells.

9. The apparatus and system of claim 1, further comprising a Gravity Orientation Sensor coupled to said Circuit Controller and Polarization Control Means coupled to said Circuit Controller and to said Antenna.

10. The apparatus and system of claim 1, in which said Radio Frequency Power Protection Input Device comprises a multi-stage limiter and a Schottky diode detector.

11. The apparatus and system of claim 1, in which said Low Noise Amplifier has a Low Noise Figure under four dB.

12. The apparatus and system of claim 1, in which said Radio Frequency Power Protection Output Device comprises a multi-stage limiter and a Schottky diode detector.

13. The apparatus and system of claim 1, in which said Radio Frequency Interface is a coaxial connector.

14. The apparatus and system of claim 1, in which said Controller Circuit comprises one or more sensors for input and output radio signal levels, input and output limiter feedback, a transmit/receive detector, one or more batteries, one or more battery chargers, one or more LNA supply sensors, one or more LNA bias sensors, one or more temperature sensors.

15. The apparatus and system of claim 1, in which said Controller Circuit comprises actuators to connect and disconnect batteries, to control said Selective Power Separator and said Selective Power Combiner, to tune said Antenna, and to communicate with said Display Means and any signal processing means of said Controller Circuit itself.

16. The apparatus and system of claim 1, in which the Display Means of said User Interface is an E-Ink display, comprising a Voltage Doubler.

17. The apparatus and system of claim 1, in which DC power is supplied via said Radio Frequency Interface.

18. The apparatus and system of claim 1, in which said Antenna is a linearly polarized, unbalanced dipole-like structure enabling it to be human-wearable.

* * * * *